June 30, 1964  C. B. BRIGHT  3,139,244
INFLATABLE VTOL AIRCRAFT
Filed Aug. 15, 1961  6 Sheets-Sheet 2

INVENTOR,
*Cooper B. Bright*

BY
ATTORNEY

June 30, 1964

C. B. BRIGHT 3,139,244

INFLATABLE VTOL AIRCRAFT

Filed Aug. 15, 1961

INVENTOR,
Cooper B. Bright

BY B. H. Bochenek
ATTORNEY

June 30, 1964  C. B. BRIGHT  3,139,244
INFLATABLE VTOL AIRCRAFT
Filed Aug. 15, 1961  6 Sheets-Sheet 5

INVENTOR,
Cooper B. Bright

BY *B. H. Bochenek*
ATTORNEY

June 30, 1964     C. B. BRIGHT     3,139,244
INFLATABLE VTOL AIRCRAFT Filed Aug. 15, 1961     6 Sheets-Sheet 6

INVENTOR,
*Cooper B. Bright*
BY
ATTORNEY

United States Patent Office 3,139,244
Patented June 30, 1964

3,139,244
INFLATABLE VTOL AIRCRAFT
Cooper B. Bright, R.D. 3, Ragged Point Road,
Cambridge, Md.
Filed Aug. 15, 1961, Ser. No. 131,691
19 Claims. (Cl. 244—12)
(Granted under Title 35, U.S. Code (1952), sec. 266)

The invention described herein may be manufactured and used by or for the Government of the United States of America for govermental purposes without the payment of any royalties thereon or therefor.

This invention relates to an aircraft at least portions of which are inflatable and which when deflated are adapted to be folded into compact packages, and more particularly to an inflatable aircraft, the inflatable portions of which are adapted to hold air pressures above atmospheric, for purposes of retaining the plane in an inflated condition.

This invention also relates to a power source that is adaptable for use in aircraft (including those utilizing effects of generated air streams on the ground to gain flight) which can accumulate and store gas under pressure for use independently or as a supplement to the installed power source for satisfying lift, aircraft control and actuation of equipments (including starting of the main engines) associated with flight operations and which can be employed without significantly increasing the cruise weight of the aircraft.

One example of the use of this power source would be an airplane either all of which, or at least portions of which are comprised of compartments adapted to hold air above atmospheric pressure for purposes of retaining the plane in an inflated condition; the pressurized air in said compartments would be adapted to be used as a power source. The air holding compartments are hereinafter designated accumulators. In accordance with this invention the use of the inflatable air frame structure is particularly adapted for use where a vertical and/or short take-off and landing (commonly termed V/STOL) requirement exists. The portions of this airplane which are inflatable (and which are not contained within rigid structures) when deflated are adapted to be folded into a compact package.

In accordance with prior art practice, little effort has been made at developing an airplane that is either entirely inflatable, inflatable in part or has inflated components contained within an inflatable or a rigid structure that are used to provide a convenient means of storing energy as a power source that can be used either independently of or with the main power source for supplying lift that is adaptable for either vertical take-off and landing or for short range take-off and landing (more commonly designated as VTOL and STOL respectively), or forward propulsion. Most prior art VTOL and STOL airplanes have been constructed of rigid structural components and are usually of such a nature as to require amounts of power in excess of that required for normal horizontal flights at usual cruising speeds. Also the installed engines are required to operate at highest power ratings during VTOL when engine failures are most likely to occur. In addition, the majority of VTOL and STOL airplanes have been so constructed, that it is usually necessary for either the entire plane or at least portions thereof to go through certain mechanical transition functions when going from vertical to horizontal flight. During this transition the airplane is in its most hazardous and unstable condition. In addition, during this period major power demands are made upon the installed engines to provide control, which adds to the total overall power required. Likewise auxiliary power needs for VTOL must all be supplied from the main engines. All requirements for power to accomplish VTOL-STOL flight add to the cruise weight of the aircraft. In addition the failure of the installed engines will likewise cause these dependent functions to cease loss of control, etc.

It is accordingly an object of this invention to provide a VTOL–STOL airplane utilizing inflatable pressurized-air accumulators in order to overcome the aforementioned disadvantages found in the prior art and in particular to insure control of the aircraft and provide lift from the compressed air in the accumulator in event of installed engine power failure.

Another object of this invention is to provide an accumulator whose power can be adjusted to be delivered in either a short period of time at high valve, or delayed over a relatively longer period of time at a lower valve.

A further object of this invention is to provide an accumulator from which it is possible to exhaust all the air which had been stored for use in obtaining VTOL flight so that no weight is added to the cruise weight of the aircraft, hence making the accumulator a weightless power source.

Another object of this invention is to use the inflatable structural aircraft as a gas accumulator, the stored power of which is adapted to provide lift, actuation of aircraft controls supply auxiliary power requirements and augment forward propulsion.

Still another object is to provide an aircraft structure which possesses structural recovery properties from impact and excessive loads.

Still a further object is to provide means whereby the inflated structure may be used as a de-icing means.

Another object is to provide a safety feature by utilizing the gas in the accumulator to control aircraft attitude during emergency descent.

It is an object of this invention to provide an inflatable VTOL–STOL plane adapted to overcome the aforementioned disadvantages found in the prior art.

A further object of this invention is to provide an aircraft at least portions of which are inflatable prior to taking flight and which are foldable and hence storable during non-flight deflated condition.

A further object of this invention is to provide an aircraft, either all or at least portions of which are formed of flexible inflatable material which portions are adapted to store air under pressure higher than atmospheric and which pressurized air may be exhausted to drive certain propulsion means adapted to cause vertical flight of the plane.

An added object of this invention is to provide an aircraft at least a portion of which is inflatable and collapsible into a folded package when deflated, which inflatable portions are adapted to store air at pressure higher than atmospheric and which includes an inflatable wing whose camber is adapted to be varied depending upon the air pressure within the wing so that the wing is adapted for selective use as both a short take-off and landing device, and in normal horizontal flight.

It is another object of this invention to provide an aircraft having at least portions thereof inflatable, which inflatable portions are adapted to store air at pressures higher than atmospheric, and having means designed to heat the air in the inflated portions to temperatures above ambient temperatures.

A further object of this invention is to provide an aircraft having ducted fans rotatable in an horizontal plane which are adapted to provide vertical lift for the aircraft and/or contribute to stability control of said aircraft.

Other objects and many of the attendant advantages of this invention will be readily appreciated as the same becomes better understood by reference to the following detailed description when considered in connection with the accompanying drawings wherein:

Figures 1, 4, 8:
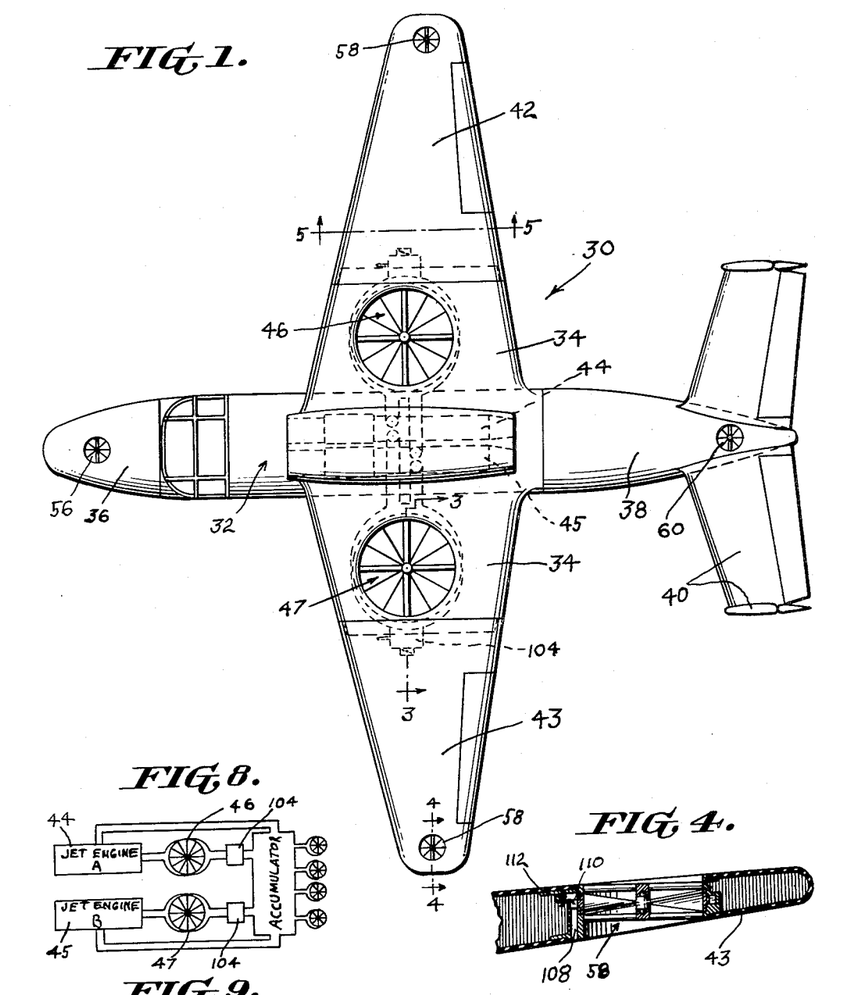
FIG. 1 is a plan view of an airplane constructed in accordance with this invention.
FIG. 4 is an enlarged sectional view of a wing mounted stabilizer fan taken on line 4—4 of FIG. 1.
FIGS. 8, 9, 10 and 11 are schematic diagrams of various embodiments of propulsion and inflation means adapted to be used with the instant invention.
Figure 2:
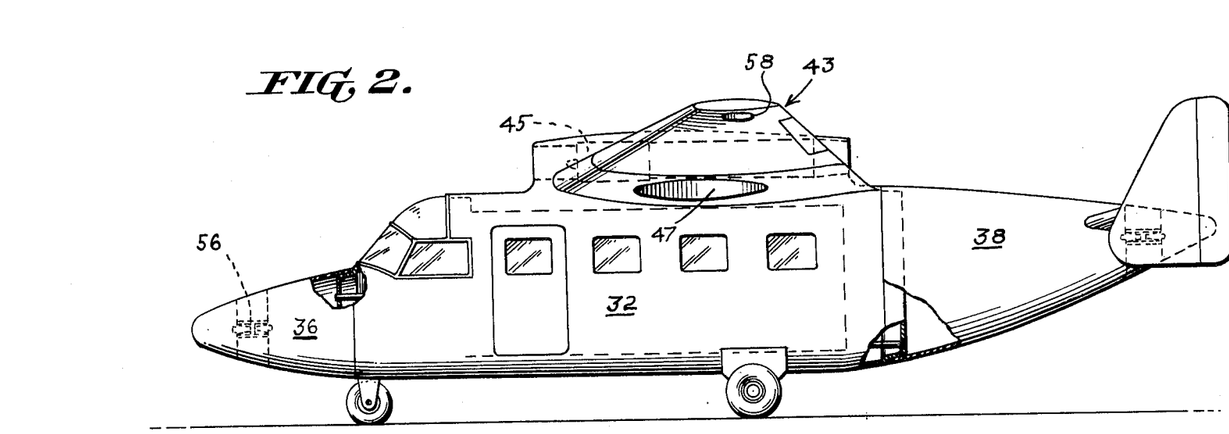
FIG. 2 is an elevational view, partially broken away, of the airplane shown in FIG. 1.

Referring to the drawings wherein like reference characters designate like or corresponding parts throughout the several views, there is shown in FIG. 1 a plan view of an inflatable airplane 30 constructed in accordance with one embodiment of this invention. The subject airplane 30 includes a cabin and power plant supporting structure 32 having stub wings 34 extending laterally therefrom. The cabin assembly 32 and the stub wing sections 34 are constructed in accordance with the usual rigid airplane construction techniques. The cabin structure 32 has attached to its forward end an inflatable, foldable cell-like nose portion 36 and at its rearmost end with an inflatable tail assembly section 38 which includes an elevator and rudder assembly 40 which are made up of an inflatable, flexible and foldable air receiving cell. Each of the stub wing sections 34 has attached to its outer end an inflatable wing section 42 formed as an inflatable, flexible air-tight cell. Each of the wing sections 42 includes conventional aileron control elements adapted to be operated from the control cabin 32. In addition, the cabin structure 32 has attached to its underside conventional landing gear.

Figure 3:
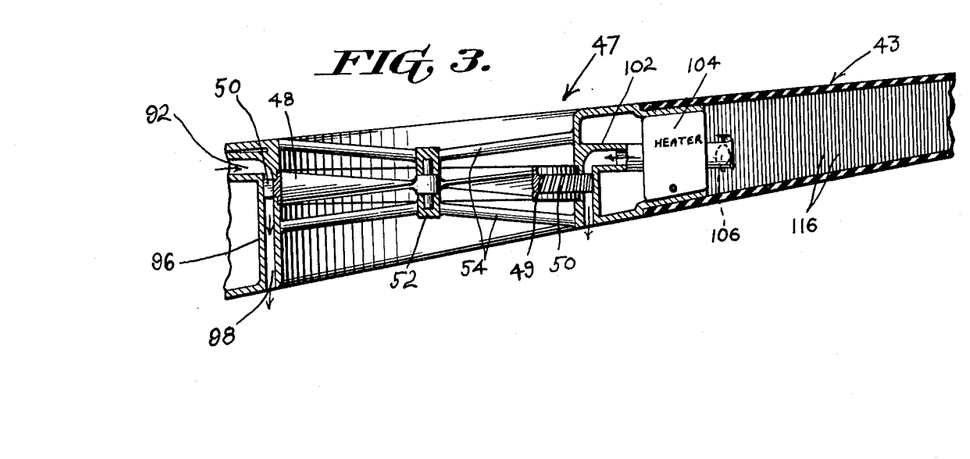
FIG. 3 is an enlarged sectional view taken on line 3—3 of FIG. 1.

The cabin structure 32 has attached thereto, in accordance with one embodiment of the invention, a pair of jet propulsion engines 44 and 45 of substantially conventional construction. In addition to providing forward propulsion for the airplane, the jet engines also may, in accordance with one embodiment of the invention, serve as a source of air for purposes of inflating the various aforementioned inflatable sections of the airplane. In addition, each of the stub wings 34 has mounted therein a ducted fan assembly 46 and 47, each of which includes a fan element 48 having a peripheral ring 49 mounted thereon. The ring 49 in turn has impeller blades 50 affixed around the outer surface thereof (FIG. 3). Each of the ducted fans 46 and 47 further includes a shroud 52 surrounding the same and has a plurality of supporting elements 54 attached to the shroud and having at their center a bearing in which the propeller 48 is rotatably mounted. The manner of operation and purpose of each of the fans 46 and 47 will be hereinafter described in greater detail.

Each of the inflatable sections of the airplane, namely the nose section 36, tail section 38 and wing sections 42 and 43 are formed of any suitable flexible, air-tight fabric and is so constructed that each constitutes a closed gas receiving cell, hereinafter referred to as an accumulator. An example of a suitable material for forming the inflatable sections of the plane is a flexible material formed of woven fiberglass, Dacron or nylon coated on one or both of its surfaces with a waterproof air-resistant material such as rubber or neoprene in much the same manner that a tire casing might be made.

The nose section or accumulator 36 is provided with a ducted fan 56 similar in construction to the larger ducted fans 46 and 47 in the stub wings 34. In addition each inflatable wing section, or accumulator, 42 and 43 is provided adjacent its outer tip with a similar small ducted fan 58 (FIG. 4). In addition, the inflatable tail assembly 38 is also provided with a ducted fan 60.

Each of the inflatable accumulators 36, 38, 40, 42 and 43 is constructed in such a manner as to be air-tight, except for the provision of a means associated therewith and hereinafter described, for allowing air to be pumped there into and/or allowed to be bled therefrom.

Figures 7, 10, 11, 12:
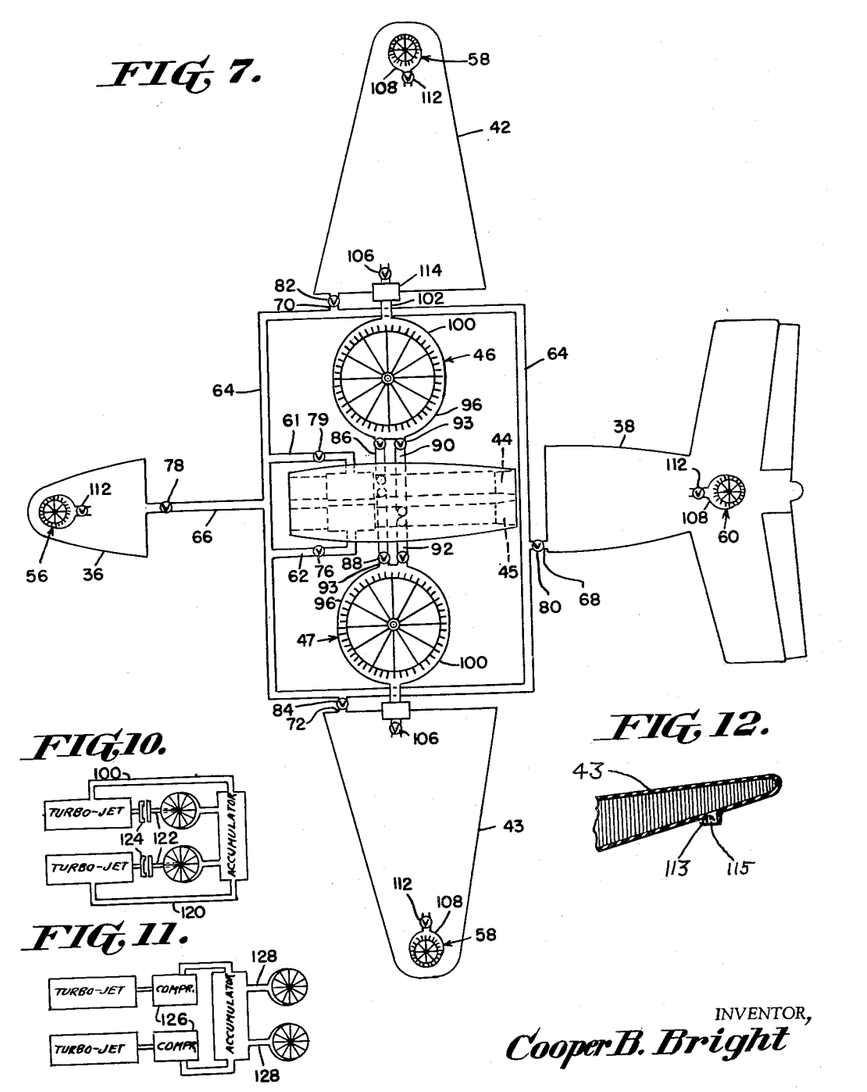
FIG. 7 is a partially schematic plan view of the structure shown in FIG. 1, showing certain features thereof in greater detail.
FIG. 12 is a sectional view showing a wing-tip located vertical air jet.

Each of the inflatable members, or accumulators, may receive its inflation air either from an outside source, or from a suitable source in the aircraft itself. Attention is directed to FIG. 7 wherein is shown a substantially schematic view of the propulsion and inflation system utilized in accordance with one embodiment of the instant invention. As previously indicated, the forward propulsion means for the subject invention comprises a right and left jet engines 44 and 45 respectively. Air is adapted to be bled from the compressor stage of each of the engines 44 and 45 by a pair of ducts 61 and 62 respectively. The ducts 61 and 62 are connected to a manifold duct system 64. The manifold 64 is connected to the accumulators 36, 38, 42 and 43 by a plurality of ducts 66, 68, 70 and 72 respectively. Each of the ducts 61, 62, 66, 68, 70 and 72 has a remotely controllable cut-off valve 74, 76, 78, 80, 82 and 84 respectively located therein so that air flow to the accumulators may be controlled. The various valves are adapted to be controlled from the cabin 32.

By properly opening and closing the valves 74 and 76 either the right hand engine 44, the left hand engine 45 or both may be used to inflate the various inflatable sections of the plane. The various valves 78, 80, 82 and 84 may be opened to admit air from the manifold to the respective accumulators 36, 38, 42 and 43. Although no gas cooler is shown, it is assumed that in cases where the temperatures of the air would exceed the allowed limits of the fabric one would be installed.

In addition to providing inflation air for the various inflatable elements of the plane, the engines 44 and 45 respectively are adapted to provide direct propulsion power for the horizontal fans 46 and 47. To accomplish this, either the combustion chamber or exhaust manifold of the engine 44 has connected thereto a pair of ducts 86 and 88 which are connected to the fans 46 and 47 respectively. The left hand engine 45 has a similar pair of ducts 90 and 92 connecting either its combustion chamber or its exhaust manifold to the fans 46 and 47 respectively. Each of the ducts 86, 88, 90 and 92 has a remotely controllable cut-off valve 93 therein.

The ducts 86, 88, 90 and 92 are in communication with a manifold 96 (FIG. 3) associated with the horizontal fans 46 and 47 respectively. The manifold 96 includes a plurality of circumferentially spaced, vertical vanes 98 which exhaust to atmosphere at the lower side of the stub wing 34. Thus hot gases are adapted to be selectively conducted from either the right or left hand engines to the respective fans by selectively connecting one or more of the ducts 86, 88, 90 and 92 to the manifold 96 surrounding the vanes 50 on the horizontal fans 46 and 47, by opening suitable ones of the valves 93. The manifold 96 is so constructed as to surround slightly more than one half of the periphery of the respective fans 46 and 47.

One of the features of this invention is that the air in the various inflated sections is adapted to be stored at pressures substantially above atmospheric, as for example, 150 p.s.i. The pressure required to maintain the various inflatable elements fully inflated for normal flight purposes is approximately 50 p.s.i., thus there is substantial additional pressure available within the inflated sections for use as a power source. To utilize the pressurized air or gas as a power source, each of the horizontal fans 46 and 47 has another manifold 100 extending partially around the fan and in communication with the peripheral vanes 50 on the respective fans (FIG. 7). Each of the manifolds 100 has in communication therewith a conduit 102 which is connected to the interior of the respective inflatable wing sections 42 and 43 through an air heating chamber 104 and a suitable cut-off valve 106. Thus, if it is desired to use the pressurized air in the wing elements 42 and 43 to drive the horizontal fans, either independently of the jet engines or in conjunction therewith, the valves 106 may be selectively opened and the pressurized air allowed to flow through a heater 104 thence through the conduit 102 into the manifold 100 to impinge upon the impeller blades 50 on the periphery of the respective fans, and thence through the vanes 98 to atmosphere.

It is emphasized that the heaters 104 are provided so that when both the hot gases from the jet engines, and the air in the inflated wing sections 42 and 43 are used simultaneously to drive the horizontal fans, the air coming from the engines and the wing sections 42 and 43 will be at about the same temperature.

As previously indicated, the respective wing sections 42 and 43, the nose section 36 and tail assembly 38 are each provided with a trim or stabilizer fan 58, 56 and 60 respectively. Each of these trim fans is adapted to be driven by the compressed air contained in their respective accumulator sections. To this end, each of the trim fans is provided with a manifold 108 at least partially surrounding the fan which in turn has around its periphery a plurality of impeller blades 110. Each of the manifolds 108 is similar in construction to the aforementioned manifolds 96 and 100 and is connected to the interior of its accumulator compartment, as for example the wing element 43, by a suitably arranged cut-off valve 112. The valves 112 are adapted to be selectively opened by remote control from the control cabin of the plane so as to admit pressurized air into the selected one or more of said manifolds 108 to drive the respective trim fans in order to restore the plane to a normal flight attitude in the event that the plane should happen to pitch, roll, or the like. These trim fans are particularly adapted for use during the vertical take-off and landing phase of operation of the instant invention.

As an alternative to the aforementioned trim fans, each of the various accumulators can be provided with a downwardly directed jet-nozzle 113 having cut-off valve 115 therein (FIG. 12).

Figure 5:
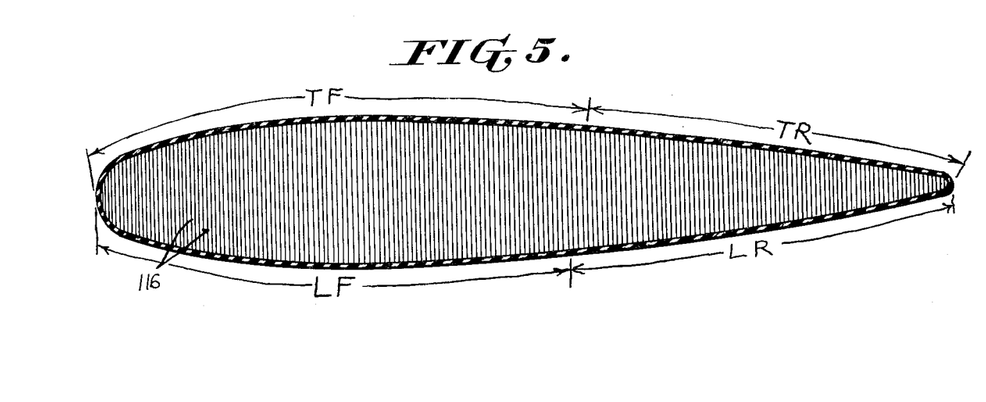
FIG. 5 is a sectional view taken on line 5—5 showing the configuration of an inflatable wing when the plane is in normal flight.
Figure 6:
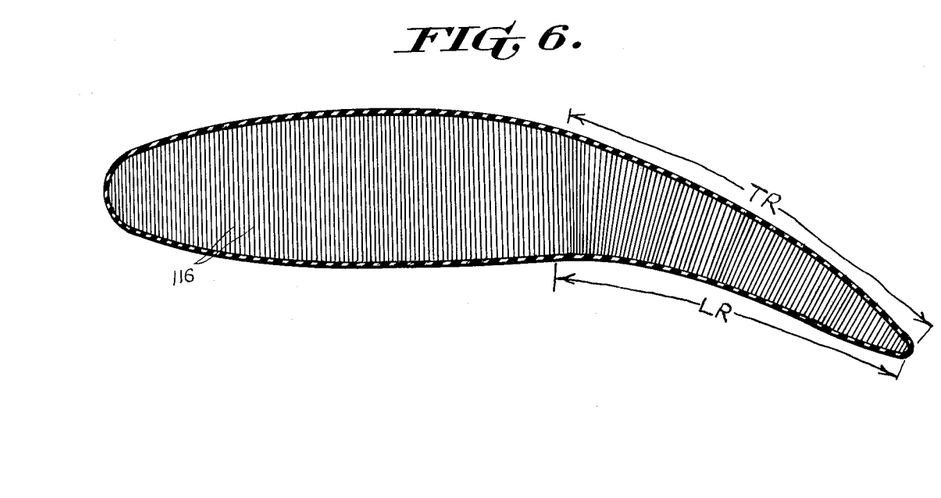
FIG. 6 is a view similar to FIG. 5, showing the configuration of the inflatable wing when particularly adapted for short take-off and landing operation.

Attention is now directed to FIGS. 5 and 6 wherein is shown sectional views of the inflated wing sections 42 and 43. As previously indicated, each of the inflatable wing sections is made up of a composite air-tight fabric composed of laminated layers of woven Dacron, nylon or the like and a layer of air-tight material such as rubber or neoprene. This particular fabric structure has not been shown in detail since it is substantially conventional and there are an infinite number of such fabrics. In designing the fabric for the instant invention the prime consideration is that it be air-tight and adapted to resist the structural pressures and forces applied to the inflated structure during both static and flight conditions. The wing elements, or accumulators, 42 and 43, and the inflated nose and tail sections 36 and 38 are each constructed of a similar material. To be more specific, each of the accumulators, as for example the accumulators 42, 43 etc. constitutes a closed container and has a plurality of thread-like elements 116 extending transversely thereof, which thread-like elements 116 are substantially inelastic and are adapted to maintain the inflated wing or the like in a fixed configuration once air under a normal pressure is pumped thereinto.

Dealing more particularly with the structure shown in FIGS. 5 and 6, it is pointed out that the wing is so constructed that the top forward portion of the wing element, marked TF in FIGS. 5 and 6, and the lower front portion LF have the same degree of elasticity. The top rear portion of the wing TR, on the other hand is of greater elasticity than the lower rear portion LR. At this point, it is emphasized that although the inflatable sections of the wing, and other inflatable accumulators or compartments are formed of flexible material, they are so designed that as a compartment they are adapted perhaps to change shape in the manner shown in FIG. 6 for example, but that the overall volume thereof varies only to the extent necessary to obtain the shape shown in FIG. 6, and once full deflection is reached, there is substantially no further increase in volume with further increase in pressure.

The purpose in having a difference in elasticity between the sections TR and LR is to provide a new and novel structure particularly adapted for use in conjunction with either VTOL or STOL airplanes. The function of this particular structural feature will hereinafter be described in greater detail under the heading of Operation.

Attention is now directed to FIGS. 8 through 11 wherein are shown various embodiments of propulsion and accumulator air supply arrangements adapted for use in conjunction with the subject aircraft. The embodiment of drive mechanism and air pump arrangement shown in FIG. 8 is substantially the same as that shown in FIGS. 1 and 7.

Figure 9:
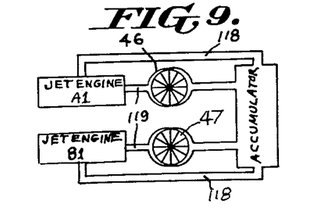

The structure shown in FIG. 9 shows an embodiment wherein each jet engine has an air bleed-off conduit 118 connected from the compressor stage of the engine to the respective accumulators. Also included are conduit members 119 connected from the jet engine exhaust to the manifolds 96 on the respective main horizontal fans 46 and 47. In this embodiment the accumulator is also connected to a manifold section on the aforementioned main fans 46 and 47.

In the embodiment shown in FIG. 10 each of the turbo-jet engines has a conduit 120 connected from its compressor stage to the various accumulators. The fans 46 and 47 in this embodiment are adapted to be driven either by compressed air from the accumulators, or by direct connection to the rotating member of the turbo-jet through suitable shaft elements 122 connected to the drive shaft of the turbine through a clutch 124. It is emphasized that in this embodiment of the invention suitable remote control means will be provided in the control compartment of the airplane to switch from direct drive, from the turbine, to the respective accumulators utilizing the valve and conduit structure similar to that shown in FIG. 7.

In the embodiment of the invention shown in FIG. 11, each turbo-jet is connected to a compressor 126 which compressor in turn supplies air to the respective accumulator compartments, such as 42, 43, 36 etc. The accumulators in turn are connected by suitable conduits 128 to the respective horizontal fans 46 and 47. In this embodiment, as in the others discussed above, the various conduits contain suitable remotely controlable cut-off valves so designed and arranged that air may be selectively fed from either one compressor or both, into the various accumulators and from the accumulators to the drive structure of the respective fans 46 and 47.

While the subject inventive concept of using air accumulators, having pressurized air therein, as a power source, has been indicated for use with a winged VTOL airplane, it is emphasized that the concept is adapted for application to other aircraft such as ground effects machines and the like, which can make use of short bursts of power.

While various pressures can be used in the accumulators, it should be noted, by way of example, that where a pressure of 50 p.s.i. is utilized to sustain the inflatable sections of the aircraft in flight configuration, and to sustain flight loads, the inflatable section will hold air at 150 p.s.i.

The pressure in excess of 50 p.s.i. is adapted to be used as a power source for driving the lift fans 46 and 47, and the auxiliary trim fans and/or trim jets in the wing tips, nose and tail assembly of the aircraft in the manner indicated above. This excess pressure provides a power source which may be of only short duration, but this is no disadvantage inasmuch as this excess power is intended to be used primarily only during vertical take-off and landing.

The air power supply stored in the accumulators is also adapted to be augmented by use of the air heaters referred to above, whereby the air temperature can be raised to as high as 1100° F., whereas the normal temperature of the air in the accumulators would be in the order of 60° F. This increase in temperature causes the accumulator power to be augmented approximately 3 fold.

*Operation*

In utilizing the subject invention, the various inflatable elements thereof are of course unfolded and placed in substantially the position shown in FIG. 1. The main propulsion engines 44 and 45 are started and the various selector valves are opened so as to allow air to be bled from the compressor section of the gas turbines to the various accumulators.

When the pressure in the various accumulators reaches 50 p.s.i., the various accumulators are fully inflated and will have sufficient strength characteristics to sustain take-off and flight load conditions. At 50 p.s.i. the cross section of the wing sections 42 and 43 takes the form shown in FIG. 5. However, in order to achieve greater lift for the purposes of either vertical or short take-off operation, the pressure, in the wing sections, or accumulators, 42 and 43 is increased to approximately 150 p.s.i., which by virtue of the relative, aforementioned, elastic characteristics of the top and bottom, rear wing sections, the wing assumes the configuration shown in FIG. 6; the increased pressure in the wing causes more stretching in the top rear section than in the lower rear section of the wing. The wing configuration shown in FIG. 6 results in a greater wing lift capability for a given forward aircraft speed.

Once the wings have taken the configuration shown in FIG. 6, the fans 46 and 47 are started by connecting the manifolds 96 of each fan to the respective turbine burner or exhaust chamber by opening the valves in the ducts 86, 88, 90 and 92. This, of course, causes rotation of the fans 46 and 47 and causes vertical lift of the plane, in addition to a lift imparted by the wings as the plane proceeds to move forward under influence of the jet engines 44 and 45. It is re-emphasized that the various valves utilized in the system are adapted to be selectively controlled from within the cabin of the plane, and since such control means are substantially conventional they have not been shown.

If it is desired to impart greater power to the horizontal fans 46 and 47, at a sacrifice of pressure within the wing section 42 and 43 of course, one or more of the valves 106 may be opened and the pre-heaters 104 activated to allow heated air to flow from within the wing sections to the manifolds 100 partially surrounding the impeller blades 50 on the fans 46 and 47.

Once the plane is ready to make its transition to horizontal flight, such transition is made, and in order to conserve power, the ducts 86, 88, 90 and 92 from the jet engines and ducts 102 from the wing accumulators 42 and 43 are closed, the fans 46, 47 are of course stopped and horizontal flight is achieved by use of the jet engines 44 and 45.

In making the transition from vertical to horizontal flight, the pressure in the wing accumulators 42 and 43 is lowered by exhausting air therefrom to a point where the cross section of the wing takes the form shown in FIG. 5.

The various trim fans 56, 58, and 60 and/or the jets (FIG. 12) can be actuated in VTOL flight by opening selective ones of the valves 112 associated therewith to allow air to enter from within the respective accumulators.

Thus the subject invention results in a VTOL-STOL aircraft that is adapted to be stored in a very compact condition, when not in use, by the use of the aforementioned inflatable sections, and at the same time makes use of said inflatable sections as a means for power storage by use of pressurized air within said inflatable sections. It is emphasized that the various inflatable sections serve a dual function, namely, as a means for sustaining flight, as is the case with the wing sections 42 and 43, and as structural support members as in the case of the nose and tail sections; at the same time the inflated sections, or accumulators, serve as a means for storing air under pressure which air is adapted to be used as at least an auxiliary means for driving vertical lift fans and/or various smaller trim fans located at strategic points in the body of the aircraft. Accordingly the accumulators in conjunction with the fans provide a hover capability.

For an example of what this invention can accomplish, attention is directed to FIGS. 13–17 which give a graphic illustration of the power advantages to be gained from the use of the aforementioned gas accumulators in conjunction with an aircraft of a particular weight and having a particular lift requirement.

Figure 13:
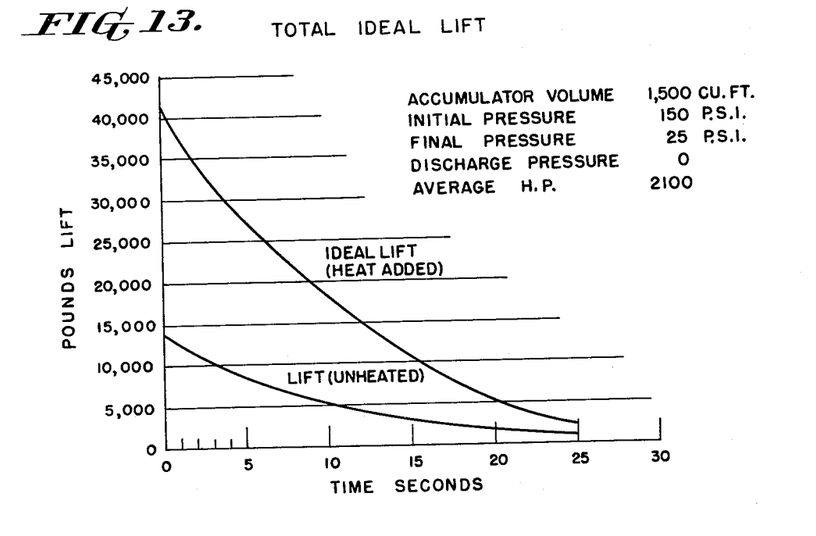
FIGS. 13–17 are graphs showing performance characteristics of an embodiment of the instant invention.

FIG. 13 shows the total lift power available from a total of 1500 cubic feet accumulator volume, when the air is expanded from an initial pressure of 150 p.s.i. to 25 p.s.i. The curve representing lift of unheated air represents the power available over a 25 second period. When a modest amount of heat is added as it leaves the accumulator and before it enters one of the turbo lift fans 46, for example, (about 60° F. to 1100° F.), the lift power available increases about 3 times as shown on the curve marked heat added.

The extra air stored in the accumulator when the pressure is increased from 50 p.s.i. to 150 p.s.i. adds about 975 pounds of weight to the aircraft. However, since the accumulator lift power (as shown in FIG. 13) greatly exceeds the added weight and the 975 pounds of air is dissipated when the accumulator pressure decreases to 25 p.s.i. at the end of VTOL flight, no weight is added to the cruise aircraft. In this sense the accumulator power may be regarded as a weightless power source.

From these power curves it can be seen that the initial lift available can be increased by adjusting the flow of air from the accumulator and thereby shortening the time in seconds it is available. As a case in point, all the air can be expelled within 5 seconds, which would increase the lift available at zero time. Likewise by allowing the air to expand over 50 seconds, the 40,000 pounds (heat added) indicated at zero time would be diminished. This latter case would be desired when the aircraft is in a hover state.

Figure 14:
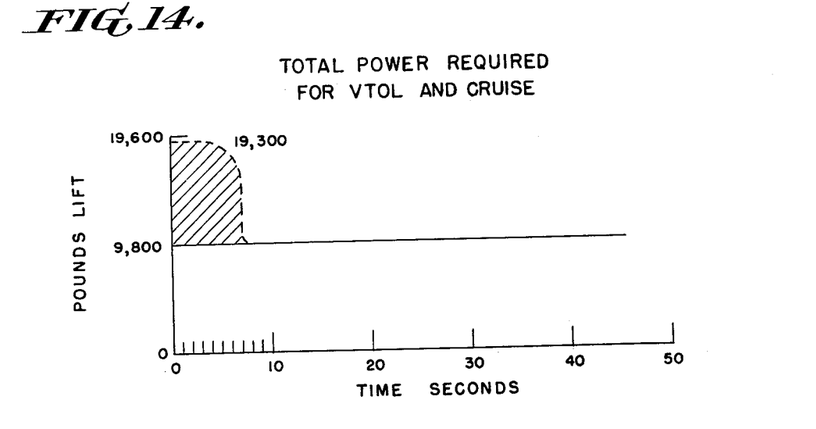

To illustrate the relationships of the potential power in a 1500 cubic foot accumulator to the take-off and cruise flight of a 1500 pound aircraft, FIG. 14 has been constructed. A lift of 9800 pounds is considered the necessary power to meet the cruise requirements of a 15,000 pound aircraft. The total lift required for VTOL of this aircraft is about 19,300 pounds. The value of 19,600 was selected as a total power to be developed. The hatched area represents the power required for 7.3 seconds of take-off time that must be added to the cruise power to insure meeting the requirement for VTOL.

Figure 15:
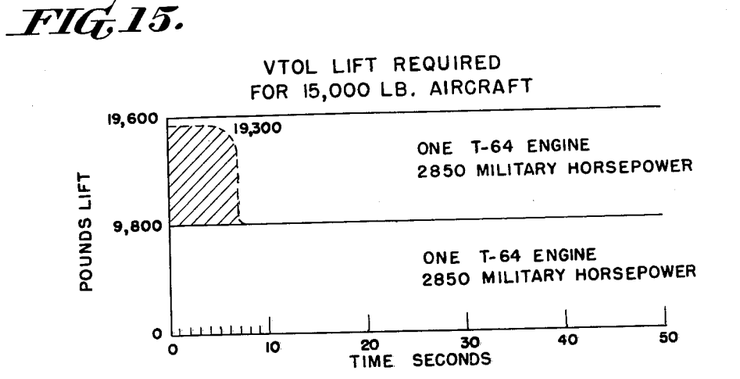

FIG. 15 illustrates that 15,000 pound airplane equipped with twin T–64 turbo prop engines operating at 2850 H.P. each can develop sufficient lift to insure a 7.3 second initial take-off. However, FIG. 15 also illustrates that after the take-off power requirement, as represented by the hatched area, is satisfied excess power remains. Present practice reduces this power during cruise flight by either shutting down engines or by throttling the engines. This is one illustration of why the addition of VTOL capability to conventional aircraft almost always incurs a loss of range or payload or both.

Figure 16:
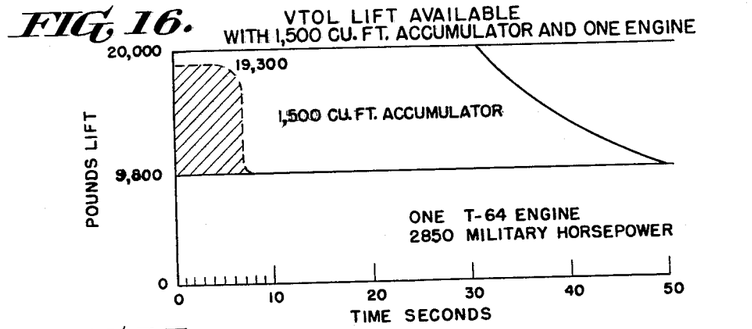

FIG. 16 illustrates the 7.3 second take-off by a 15,000 pound aircraft substituting a 1500 cubic foot accumulator in place of one T-64 engine. The remaining T-64 engine produces the same 9,800 pounds of lift at military horsepower rating (2850 H.P.). The remaining 10,200 pounds of lift required for a total of 20,000 is developed by the accumulator. In this case the accumulator air control valve has been set to provide lift to meet the 7.3 second take-off requirement for VTOL, as represented by the hatched area, but also maintains a flat expansion cruise for 30 seconds. The total duration of expansion continues for 50 seconds. Thus from a 1500 cubic foot accumulator sufficient lift is developed to supply the power requirements for aircraft control, auxiliary power needs, brief hover, etc. Likewise in the case of engine failure during take-off the majority of accumulator power remains for use in making a safe landing.

Figure 17:
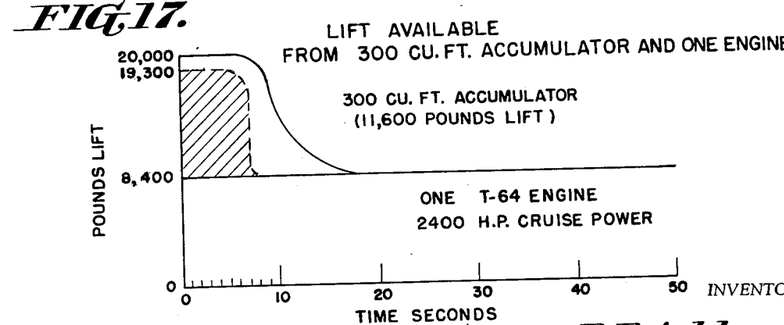

FIG. 17 illustrates the flexibility of accumulator power. In this power arrangement, the T-64 engine operated at cruise horsepower rating (2400 H.P.) during VTOL as compared with full military power (2850 H.P.) as shown in FIG. 16. Operating at this rating a reduced lift is developed totaling 8,400 pounds as compared to 9,800 pounds at military power. By operating the engine at the lower cruise power its reliability will be greatly increased during the most critical period of VTOL. Also, the full military power of the engine is still available for employment under emergency conditions. The accumulator produces 11,600 pounds of lift, which when added to the 8,400 pounds totals 20,000 pounds. However, in this case the size of the accumulator has been reduced from 1500 cubic feet to 300 cubic feet. It can be seen that the power requirement for VTOL shown by the hatched area is satisfied and extra power is provided for auxiliary power needs but no short hover capability remains.

Changing the size of the accumulator is but one way of improving its flexibility. Another example of a way that the lift developed in excess of the VTOL can be used, is to reduce the maximum pressure of 150 p.s.i. to a lower value or to raise the lower value of 25 p.s.i.

In terms of take-off paths, the lift supplied by the accumulator engine power combination should be programmed to accelerate the aircraft to speeds in excess of stall velocity to allow the lift of the wings to support the aircraft. Although the lift of the accumulator is used up very rapidly, the aircraft wing load carrying ability also increases rapidly with the velocity.

Obviously many modifications and variations of the present invention are possible in the light of the above teachings. It is, therefore, to be understood that within the scope of the appended claims the invention may be practiced otherwise than as specifically described.

What is claimed is:

1. An aircraft comprising, an air frame, a gas driven propulsion means on said aircraft, a flexible, inflatable and foldable gas storage compartment that is so constructed as to have a maximum volumetric capacity that is substantially independent of the pressure of gas therein, means for injecting gas into said compartment at greater than atmospheric pressure, said compartment, upon inflation, constituting a part of the aircraft's fixed, inherent supporting structure, gas conducting means for conveying pressurized gas from said compartment to said propulsion means to drive said propulsion means, said gas conducting means including a heater for heating the gas above ambient temperature as it passes from said compartment to said propulsion means.

2. An aircraft comprising an air frame, vertical lift propulsion means on said air frame, said vertical lift propulsion means being operable by compressed gas, at least one inflatable, foldable, gas storage compartment on said air frame that is so constructed as to have a maximum volumetric capacity that is substantially independent of the pressure of gas therein, said compartment being so constructed and arranged on said aircraft as to be a part of the aircraft's fixed, inherent supporting structure, means for injecting gas into said compartment at a pressure greater than atmospheric, and means for conducting compressed gas from said compartment to said vertical lift propulsion means to drive said propulsion means.

3. An aircraft as set forth in claim 2, wherein said vertical lift propulsion means comprises a ducted fan rotatable about a vertical axis.

4. An aircraft as set forth in claim 2, wherein said vertical lift propulsion means comprises at least one downwardly directed jet.

5. An aircraft comprising an air frame, said air frame comprising a fuselage portion, wings extended laterally from said fuselage, and a tail assembly, said air frame including a plurality of structural elements, at least one of said structural elements being a flexible, inflatable, foldable gas storage compartment that is so constructed as to have a maximum volumetric capacity that is substantially independent of the pressure of gas therein; said compartment being adapted to hold gas therein at pressures higher than atmospheric, a main aircraft propulsion means on said air frame for propelling the aircraft in a forward direction, auxiliary, gas-driven propulsion means for propelling the aircraft in a vertical direction, means for injecting gas into said inflatable portions of the aircraft at a pressure greater than atmospheric, and means for conducting compressed gas from at least one of said inflatable compartments to said auxiliary propulsion means to drive the same.

6. An aircraft comprising an air frame, said air frame comprising a fuselage having a nose portion and tail assembly, wings extending laterally from said fuselage, at least, a portion of each wing being formed as a foldable, flexible, inflatable, gas-tight compartment that is so constructed as to have a maximum volumetric capacity that is substantially independent of the gas pressure therein and forms a part of each of said wings, a main propulsion engine on said fuselage for driving the aircraft in a forward direction, auxiliary vertical lift propulsion means in each of said wings, said vertical lift propulsion means being driveable by compressed gas, means for injecting gas into said inflatable wing portions at a pressure higher than atmospheric and higher than that required to maintain the wing in flight conformation, and means for conducting compressed gas from at least one of said wing portions to said vertical propulsion means to drive the same.

7. An aircraft as set forth in claim 6, wherein the main propulsion means is a gas turbine engine and means is provided for utilizing the gases from said engine, as well as the gases from said inflated wing portions, to actuate said vertical propulsion means to provide total lift.

8. An aircraft as set forth in claim 18 including means for selectively conducting compressed gas from said inflated nose portion and tail portions to said vertical propulsion means for driving the same.

9. An aircraft comprising an air frame, said air frame including a fuselage, wings extending laterally from said fuselage, a nose portion and a tail assembly, aircraft propulsion means on said air frame for driving the aircraft in a forward direction, a downwardly blowing, ducted fan in each of said wings, said ducted fans providing vertical lift, each of said fans having a plurality of turbine blades mounted around the periphery thereof in physical connection therewith, a plurality of inflatable, gas-tight foldable gas storage compartments on said aircraft, said compartments being constructed to retain gas at pressures higher than atmospheric, and having a maximum volumetric capacity that is substantially independent of the gas pressure therein, each of said compartments defining a part of the aircraft's fixed, inherent supporting structure, means for injecting gas into said compartments at a pressure higher than atmospheric, means conducting compressed gas from at least one of said compartments to the turbine blades on at least one of said ducted fans to provide driving means for said fans, whereby said compressed gas is adapted to be used as a power source for driving said fans to provide vertical propulsion for the aircraft without the use of additional power plants or power take-offs for said fans.

10. An aircraft as set forth in claim 9, wherein said nose portion, wings and tail assembly are each formed as an inflatable, foldable, gas-tight compartment constructed to retain gas at pressures higher than atmospheric, and means for conducting pressurized gas from at least one of said wings, nose portion and tail assembly to the turbine blades on said ducted fans to provide a propulsion means for said fans, and each of said inflatable portions of the aircraft being foldable into a compact package upon deflation.

11. An aircraft comprising an air frame, said air frame including a fuselage, wings extending laterally of said fuselage, at least a portion of each of said wings being formed as a foldable, inflatable, gas-tight, compartment that is so constructed as to have a maximum volumetric capacity that is substantially independent of the gas pressure therein, said compartment being so constructed that, when inflated, it has the aerodynamic lift capabilities characteristic of an aircraft wing, a horizontal fan in each of said wings rotatable about a vertical axis and so arranged as to blow downwardly thereby providing vertical propulsion means for the aircraft, a main propulsion means on said air frame constructed to provide forward propulsion for the aircraft, means on said aircraft for pumping gas into said inflatable wing portions to a pressure higher than atmospheric, and means for conducting compressed gas from said inflated wing portions to a driving means connected to each of said fans to provide propulsion means for said fans.

12. An aircraft as set forth in claim 11 further including means drivably interconnecting said main propulsion means to the fans in said wings, whereby said fans are adapted to be driven by both said main propulsion means and the compressed gas from said inflatable wings.

13. An aircraft as defined in claim 11 wherein said propulsion means for providing horizontal propulsion includes a gas turbine stage said aircraft further including means for conveying gas from said gas turbine stage to each of said fans to provide means for actuating said fans, and an air heater interposed between the gas in each of said inflated wings and the respective fans whereby air from within the wings may be pre-heated before reaching said fans.

14. An aircraft as set forth in claim 11 wherein each of said fans is provided with a plurality of blades the tips of which are interconnected by an annular member, a plurality of turbine blades mounted on said annular member and extending radially therefrom, means for conducting compressed gas from said respective wings to a point of impingement upon the turbine blades on the respective horizontal fans, whereby said compressed gas is adapted for use as a fan driving means.

15. An aircraft comprising an air frame, said air frame including a fuselage, wings extending laterally from said fuselage, a nose portion and a tail assembly, a ducted fan in each of said wings adjacent said fuselage and mounted for rotation about a vertical axis and having the air stream thereof downwardly directed to provide vertical propulsion means for the aircraft, a trimmer ducted fan mounted adjacent the outer tip of each of said wings and rotatable about a vertical axis and so arranged as to provide a downwardly directed air stream, at least one flexible, foldable, inflatable, gas-tight compartment so constructed as to have a maximum volumetric capacity that is substantially independent of the gas pressure therein, said compartment defining a part of the aircraft's fixed, inherent supporting structure; means on the air frame for providing compressed gas to said compartment at a pressure higher than atmospheric, a plurality of impeller blades mounted around the periphery of each of said fans, and means for conducting compressed gas from selected ones of said compartment to the impeller blades on selected fans to provide a power source for driving said fans.

16. A propulsion system for a vertical take-off aircraft comprising a forward propulsion means, a vertical propulsion means, said vertical propulsion means being actuatable by compressed gas, at least one foldable, flexible gas storage compartment so constructed as to have a maximum volumetric capacity that is substantially independent of the gas pressure therein, said compartment defining a part of the inherent supporting structure of said aircraft when attached thereto; means for pumping gas into said storage means at a pressure greater than atmospheric, and selectively operable gas conduction means for selectively conducting compressed gas from said storage means to said vertical propulsion means whereby said vertical propulsion means may be actuated.

17. An aircraft comprising, an air frame, said air frame including a plurality of structural elements, at least one of said structural elements being a flexible, inflatable, foldable fluid storage compartment defining part of the aircraft's fixed, inherent supporting structure, said compartment being so constructed as to have a maximum volumetric capacity that is substantially independent of the gas pressure therein; means for injecting fluid into said compartment at greater than atmospheric pressure, fluid driven propulsion means, and fluid conducting means for conveying pressurized fluid from said compartment to said propulsion means for use as a power source.

18. An aircraft comprising, an air frame, including a fuselage having a nose portion and a tail assembly, said nose portion and tail assembly each being formed of inflatable, collapsible, gas-tight compartments constructed to be inflated to a pressure higher than atmospheric and greater than that required to maintain them in normal flight conformation; wings extending laterally from said fuselage, at least a portion of each wing being formed as a foldable, flexible, inflatable gas-tight compartment, a main propulsion engine on said fuselage for driving the aircraft in a forward direction, auxiliary vertical lift propulsion means in each of said wings said vertical lift propulsion means being driveable by compressed gas, means for injecting gas into said inflatable wing portions at a pressure higher than atmospheric and higher than that required to maintain the wing in flight conformation, and means for conducting compressed gas from at least one of said wing portions to said vertical propulsion means to drive the same.

19. An aircraft comprising, an air frame, said air frame having structural members comprising a fuselage, aerodynamic lifting surfaces; at least one flexible, inflatable, foldable fluid storage compartment, said compartment defining at least a portion of the structure of one of said structural members, means for injecting fluid into said compartment at greater than atmospheric pressure, fluid driven propulsion means, and fluid conducting means for conveying pressurized fluid from said compartment to said propulsion means for use as a power source.

References Cited in the file of this patent

UNITED STATES PATENTS

| 984,269 | Friedel | Feb. 14, 1911 |
| 1,021,338 | Rush | Mar. 16, 1912 |
| 1,598,554 | Caughlin | Aug. 31, 1926 |
| 1,939,156 | Wright | Dec. 12, 1933 |
| 2,681,774 | Winzen | June 22, 1954 |
| 2,870,978 | Griffith | Jan. 27, 1959 |
| 2,886,265 | Ritter | May 12, 1959 |
| 2,899,149 | Breguet | Aug. 11, 1959 |
| 2,979,287 | Ross | Apr. 11, 1961 |

FOREIGN PATENTS

| 811,840 | Great Britain | Apr. 15, 1959 |